United States Patent [19]

Bishop

[11] 4,029,337

[45] June 14, 1977

[54] CAMBER INDICATING LINKAGE

[75] Inventor: Joseph Gerald Bishop, West Bloomfield, Mich.

[73] Assignee: American Motors Corporation, Detroit, Mich.

[22] Filed: Feb. 19, 1976

[21] Appl. No.: 659,298

[52] U.S. Cl. .............................. 280/661; 33/203.18
[51] Int. Cl.[2] ........................................ B62D 17/00
[58] Field of Search .......... 280/661, 95; 33/203.18; 340/52 R

[56] References Cited

UNITED STATES PATENTS

| 2,672,597 | 3/1954 | Ritch | 33/203.18 X |
| 3,438,646 | 4/1969 | Hannapel | 280/661 X |
| 3,498,630 | 3/1970 | Crawford | 280/661 X |

*Primary Examiner*—Joseph F. Peters, Jr.
*Assistant Examiner*—Terrance L. Siemens
*Attorney, Agent, or Firm*—Reising, Ethington, Barnard, Perry and Brooks

[57] ABSTRACT

A linkage of the disclosure is utilized with a vehicle independent suspension system to indicate whether a wheel supported by the system has a proper camber angle. The linkage includes a first linkage portion extending between a control arm of the suspension system and a wheel supporting member so that the angular relationship therebetween is sensed. A second linkage portion extends between the control arm and the sprung mass of the vehicle so that the angular relationship therebetween is also sensed. The angular relationships sensed by the two linkage portions are compared so as to determine whether the wheel supporting member is angularly oriented so that the wheel supported thereby has a proper camber angle. Each linkage portion preferably includes a push-pull link and a lever pivoted to each other. Connections of the linkage components are at predetermined locations so that the levers are pivotally positioned with respect to each other at a predetermined angle when the wheel camber angle is proper. When the wheel camber angle is not proper, the levers are pivotally positioned in one direction or the other with respect to each other from the predetermined angle to thereby indicate the improper camber angle condition. When utilized with a front independent suspension system, the push-pull link of the first linkage portion is connected to the wheel supporting steering knuckle along the steering axis thereof such that the steering angle does not inhibit the linkage operation. One embodiment utilizes visually observable indications on the levers to indicate whether the steering angle is proper, and another embodiment incorporates an electric circuit that generates a signal when the wheel camber angle deviates from the proper angle in either direction a predetermined extent. The linkage may be incorporated as part of the suspension system or may be used as a tool to check the camber angle.

15 Claims, 2 Drawing Figures

CAMBER INDICATING LINKAGE

BACKGROUND OF THE INVENTION

1. Field of the Invention

This invention relates to a linkage for use with a vehicle independent suspension system to indicate the camber angle of a wheel supported by the suspension system.

2. Description of the Prior Art

Vehicle independent suspension systems are presently incorporated in production vehicles such as automobiles, trucks, and vans, etc. Such suspension systems each support an associated wheel and tire for vertical up-and-down movement that is known as suspension jounce. On a horizontal roadway the angle between the center plane of the wheel and a vertical plane that extends through the wheel center point along the direction the wheel rolls is referred to as the wheel camber angle. When the center plane of the wheel is tilted inboard of the vertical plane at the lower side of the wheel, a positive wheel camber angle is present. A negative wheel camber angle is present when the center plane of the wheel is tipped outboard of the vertical plane at the lower side of the wheel. Maximum tire mileage is usually achieved when the wheel camber angle is 0° with the center plane of the wheel oriented vertically.

United States production vehicles usually incorporate independent suspension systems only with the front wheels. However, some domestic vehicles do include rear independent suspension systems as well instead of the more conventional solid axle interconnection between the rear wheels. Foreign vehicles conventionally are manufactured with independent suspension systems for both the front and rear wheels.

Foreign and domestic independent suspension systems conventionally incorporate at least one pivotal control arm and a wheel supporting member mounted on the control arm by a joint. If the suspension system is for a front wheel, the wheel supporting member is the steering knuckle on which the wheel is supported. A wheel spindle constitutes the wheel supporting member if the suspension system is for a rear wheel. Usually, a pair of control arms are utilized with domestic independent suspension systems to mount the wheel supporting member. For example, the steering knuckle of a front system is supported on upper and lower control arms by a pair of ball joints. With foreign vehicles, the independent suspension system utilizes a cylinder-like strut that cooperates with a single control arm to mount the wheel supporting member.

Wheel camber angle is conventionally measured by instruments which shine a beam of light from the wheel onto a screen having indications that tell whether the camber angle is proper. The camber angle measurement by these conventional instruments is vehicle attitude sensitive. Normal camber angle change on conventional suspension systems is in the area of one half to one degree of change per inch of suspension travel. Consequently, domestic manufacturers generally specify a vehicle attitude or vehicle loading condition at which the camber angle must be checked or set to a designated amount. Conventional optical measurement equipment requires an accurately leveled base or platform from which to make measurements on the vehicle. The vehicle when placed on the base or platform must be in the correct attitude designated by the manufacturer and is sensitive to tire pressures, wheel run out, fuel and cargo loadings.

If the camber angle is not proper, adjustment is usually accomplished in one of two ways. The mounting of the suspension system on the sprung mass of the vehicle may include accommodations for shims whose thickness determines the camber angle. Thus, a positive or negative camber angle can be changed by adding thicker or thinner shims as required. Another way to adjust the camber angle is to have the components of the suspension system include a suitable threaded or eccentric type of adjustment that changes the camber angle. The following U.S. Pat. Nos. disclose various wheel camber adjustment suspension systems: 2,605,188; 2,664,297; 2,684,253; 2,900,196; 2,923,555; 3,033,588; 3,034,810; and 3,342,507.

SUMMARY OF THE INVENTION

The present invention relates to a linkage utilized with a vehicle independent suspension system to determine whether the wheel camber angle thereof is proper. The linkage may be utilized as a tool for checking the camber angle or, alternately, may be incorporated as a permanent subassembly of the suspension system to constantly monitor the camber angle. The linkage is not vehicle attitude sensitive and senses the manufacturers designated camber angle at any and all positions of suspension travel. Therefore, a level base or platform for making measurements and uniform vehicle loading during measurement are not required.

A first portion of the linkage extends between the wheel supporting member of the associated suspension system and an associated control arm thereof so as to sense the angular relationship between the wheel supporting member and the control arm. A second linkage portion extends between and senses the angular relationship between the control arm and the sprung mass of the vehicle. The linkage is designed in such a manner that a constant or known angular relationship of the linkage portions is maintained throughout the travel limits of the suspension system. The angular relationships sensed by the two linkage portions are compared so as to determine whether the wheel supporting member is angularly oriented so that a wheel supported thereby has a camber angle which is proper.

Each linkage portion preferably includes a push-pull link and a lever pivoted to each other. The push-pull link of the first linkage portions is connected to the wheel supporting member and the push-pull link of the second linkage portion is connected to the sprung mass of the vehicle. The two levers are supported on the control arm so as to pivot thereabout at a predetermined angle relative to each other when the camber angle is proper. The pivoting of the levers takes place as the suspension jounce causes angular linkage movement to move the push-pull links and thereby pivot the levers. The connections of the linkage are chosen at locations such that the linkage geometry causes the levers to pivot at the predetermined angle with respect to each other when the wheel camber angle is proper. One embodiment incorporates visual indications on the two levers to determine whether the wheel camber angle is proper. Another embodiment incorporates an electric circuit that generates a signal when the angle between the levers deviates from the predetermined one a certain extent.

The predetermined angular relationship of the two linkage levers is maintained throughout the suspension jounce travel and wheel steering motions when the camber angle is proper. The angular relationship of the levers changes from the predetermined position in a direct relationship to the amount of camber error.

The disclosed linkage is utilized with a front independent suspension system having upper and lower control arms. A steering knuckle of the system constitutes the wheel supporting member and is connected to the push-pull link of the first linkage portion by a ball and socket connection located along the steering axis of the knuckle. Consequently, the steering angle of the knuckle about the steering axis does not affect the operation of the linkage in indicating the properness of the wheel camber angle. Ball and socket connections also pivotally interconnect each push-pull link to its associated lever so that the angular orientation of the axes of pivoting of the upper and lower control arms to the sprung mass of the vehicle does not inhibit the functioning of linkage. As disclosed, the two levers of the linkage are pivoted to each other about a first axis and one of the levers is pivoted to the upper control arm about a second axis that is spaced from the first axis in a parallel relationship.

The objects, features and advantages of the present invention are readily apparent from the following detailed description of the preferred embodiments taken in connection with the accompanying drawings.

DETAILED DESCRIPTION OF THE PREFERRED EMBODIMENTS

Figure 1:
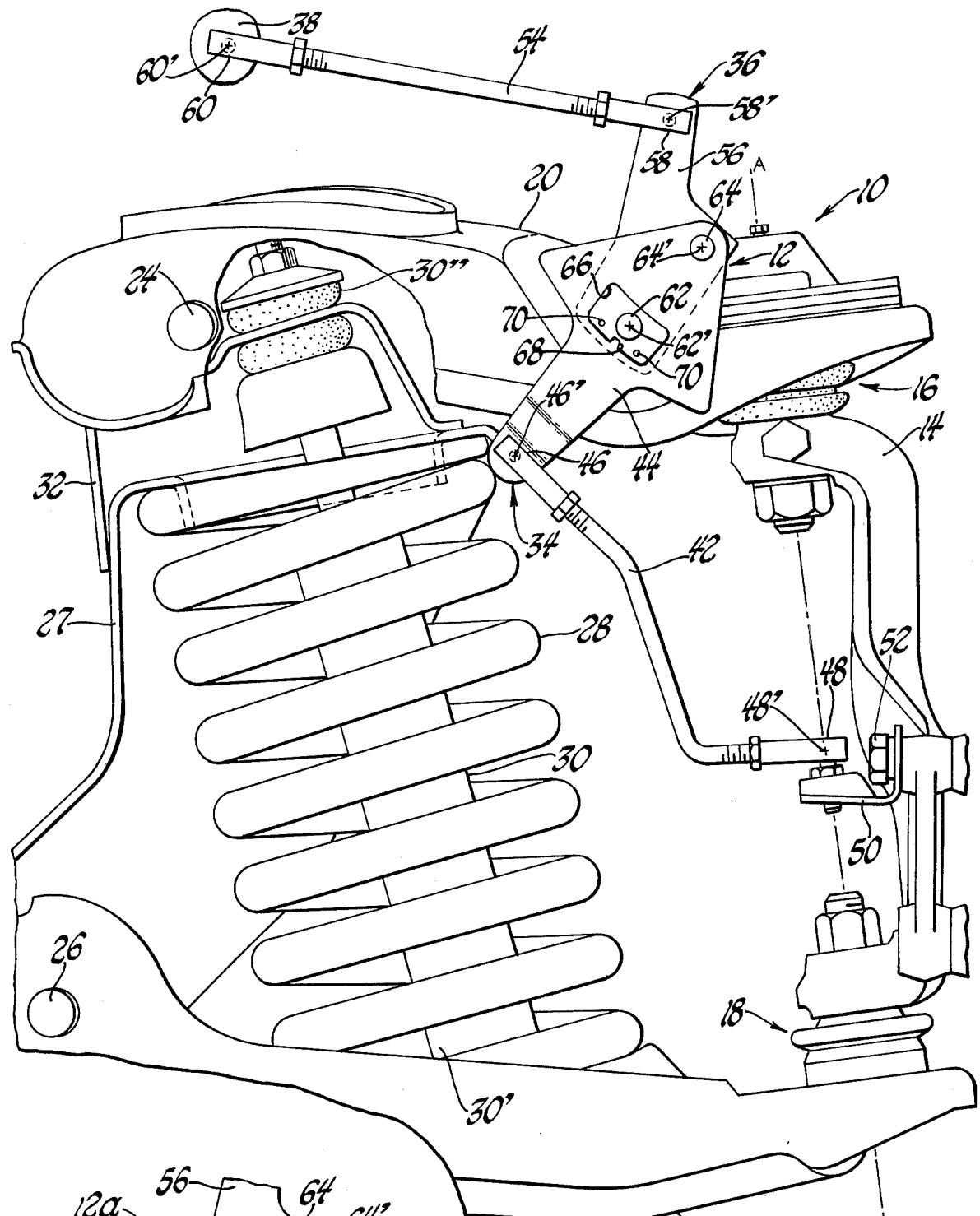
FIG. 1 is a view of a vehicle independent suspension system having a camber indicating linkage that embodies the present invention.

Referring to FIG. 1 of the drawings, a vehicle front independent suspension system is generally indicated by reference numeral 10 and includes a wheel camber angle indicating linkage 12 that is constructed in accordance with the present invention. The linkage indicates whether a steering knuckle 14 of the suspension system is angularly oriented so that a wheel supported thereby has the proper camber angle. Conventional upper and lower ball joints 16 and 18, respectively, mount the steering knuckle 14 on upper and lower control arms 20 and 22 for vertical jounce movement as well as for angular steering movement about a steering axis A of the knuckle. The upper and lower control arms 20 and 22 are respectively pivoted to the sprung mass of the vehicle by pins 24 and 26 in a conventional manner. A frame member 27 of the sprung vehicle mass seats the upper end of a helical spring 28 whose lower end is seated against the upper side of the lower control arm 22. A shock absorber 30 is received in the center of the spring 28 and has a lower end 30' secured to the lower control arm 22 and an upper end 30" secured to a frame member 32 of the sprung vehicle mass. The spring 28 and the shock absorber 30 cooperate during suspension jounce to control the vertical movement of the steering knuckle 14 in a conventional fashion.

The wheel camber angle indicating linkage 12 includes first and second linkage portions 34 and 36 for sensing angular relationships of the suspension system. The first linkage portion 34 extends between the steering knuckle 14 and the upper control arm 20 so as to sense the angular relationship between the steering knuckle and this control arm. The second linkage portion 36 extends between the upper control arm 20 and a frame portion 38 of the sprung vehicle mass so as to sense the angular relationship between this control arm and the sprung mass of the vehicle. The angular relationship sensed by these two linkage portions are compared, as will be more fully hereinafter described in detail, to determine whether the steering knuckle 14 is angularly oriented so that a wheel carried thereby has a camber angle that is proper. The embodiment of the linkage shown in FIG. 1 compares these angular relationships by visually observable indications on the linkage, while the embodiment of the linkage 12a shown in FIG. 2 performs this function via an electric circuit 40 which will be discussed later in more detail. It should be pointed out that either of these camber angle indicating linkages 12 or 12a can be incorporated as a permanent subassembly of the suspension system or can be utilized as a tool for checking the wheel camber angle.

The first linkage portion 34 includes a push-pull link 42 and a lever 44 that are pivoted to each other by a ball and socket connection 46. The push-pull link 42 is also pivoted by a ball and socket connection 48 to a bracket 50 on the steering knuckle 14. A bolt 52 secures the bracket 50 in position so that the center 48' of the ball and socket connection 48 is located generally along the steering axis A of the steering knuckle. Consequently, the steering angle of the knuckle 14 about its steering axis A does not affect the wheel camber angle indicating function of the linkage.

The second linkage portion 36 also includes a push-pull link 54 and a lever 56 which are pivoted to each other by a ball and socket connection 58. Push-pull link 54 is pivotally connected to the frame portion 38 of the sprung vehicle mass by another ball and socket connection 60 while the lever 56 is pivotally connected to the upper control arm 20 by a pin 62 for movement about a first pivotal axis. Another pin 64 pivotally interconnects levers 44 and 56 about a second axis that is spaced from the axis of pin 62 in a parallel relationship. An observer can see the pin 62 through an opening 66 in lever 44. At the edge of this opening 66, the lever 44 defines a projection 68 that is positioned throughout the linkage movement in alignment with pin 62 on the opposite side of pin 64 when the wheel camber angle is proper. The linkage moves the projection 68 to one side or the other of pin 62 about its pivotal connection by pin 64 when the wheel camber angle is not proper. Movement of the projection 68 far enough so as to be aligned with one of the indications 70 on lever 56 indicates that the wheel camber angle has deviated sufficiently from a proper angle so as to require adjustment. Thus, the relative movement of the levers from a predetermined angle with respect to each other indicates an improper wheel camber angle.

For proper operation of the camber indicating linkage 12 to take place, the push-pull links and levers of the linkage must be associated with the suspension system and the sprung mass of the vehicle at proper locations. Given the shapes and sizes of the linkage components, three points are determinative of proper linkage function. These points are the center 48' of the ball and socket connection 48 along the steering axis A, the center 62' of the pin 62, and the center 60' of the ball and socket connection 60. Any two of these three points may be arbitrarily selected but there will then be only one location where the third point can be located for the linkage to function properly, i.e. the lever projection 68 will be maintained in alignment with pin 62 on the opposite side of pin 64 when the wheel camber angle is proper. The centers 46' and 58' of the ball and socket connections which interconnect the levers and push-pull levers of the linkage portions and the center 64' of pin 64 also have an effect on the angular movement of the linkage during vehicle suspension movement. However, once the sizes and pivotal interconnections between the linkage components are chosen, the three previously mentioned points are the ones which must be selected at predetermined location for the linkage to operate properly throughout the angular linkage movement that takes place during suspension jounce.

During upward suspension jounce, the angles between the links and levers of each linkage portion 34 and 36 will be decreasing as they sense the angular relationships of the upper control arm 20 with respect to the steering knuckle 14 and the sprung mass of the vehicle, respectively. If the steering knuckle is oriented properly so that an associated wheel supported thereby has a proper camber angle, both of the levers 44 and 56 will pivot about the center 62' of pin 62 with the projection 68 of lever 44 maintained in alignment with the pin 62 on the opposite side of pin 64. When the steering knuckle 14 is not angularly oriented so that an associated wheel carried thereby has a proper camber angle, the linkage portions 34 and 36 will move their associated levers 44 and 56 so that the projection 68 is on one side or the other of a line through pins 62 and 64. Furthermore, when the camber angle deviates from the proper one a certain extent, the linkage portions will move their associated levers so that the lever projection 68 on lever 44 will be aligned with one or the other of the visually observable indications 70 on the lever 56. This latter alignment indicates that the wheel camber angle deviates from a proper angle enough so that camber adjustment is required.

An example of the operation of the linkage 12 can be readily understood by assuming that the wheel supported by the steering knuckle 14 has a positive camber angle. The wheel will then have its lower side tipped inboard from a vertical plane through the center point of the wheel as would be the case if the effective length of the upper control arm 20 were too long or the effective length of the lower control arm 22 were too short. Consequently, the first linkage portion 34 will then pivotally locate its lever 44 clockwise about pin 64 from the position shown so that its projection 68 is located upwardly and to the left from the pin 62 toward the upper left hand indication 70 on lever 56. Similarly, a negative camber angle of the wheel will cause the lever 44 to be located in the opposite direction about pin 64 so that it moves toward the lower right-hand indication 70 on the lever 56. Thus, one can observe the relative position of the lever projection 68 with respect to the pin 62 in order to determine whether the wheel camber angle of the suspension system is proper.

Figure 2:
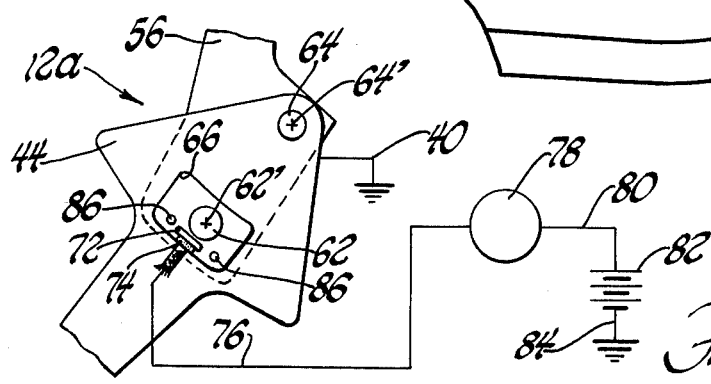
FIG. 2 is a view which shows part of the linkage of another embodiment.

The linkage embodiment 12a shown in FIG. 2 functions the same as the embodiment of FIG. 1 but has the electric circuit 40 previously mentioned that indicates whether the wheel camber angle is proper. This linkage includes a contact 72 mounted on the lever 44 by an insulator 74 and connected by a wire 76 to an indicator 78 such as a buzzer or a light. The indicator 78 may be mounted on the vehicle instrument panel if desired when the linkage is incorporated as a permanent subassembly of the wheel suspension system. A wire 80 connects the indicator to a battery 82 that is connected to ground by wire 84. The lever 56 of the linkage is metallic and grounded as are the other components of the vehicle suspension system and includes contacts 86 that correspond to the indications 70 of the linkage embodiment shown in FIG. 1. As is evident from this discussion, the contact 72 moves into engagement with one of the contacts 86 when the linkage 12a senses an improper camber angle of a predetermined extent. This energizes the indicator 78 so as to provide a signal that camber adjustment is necessary.

The ball and socket connections 46, 48, 58 and 60 of the camber indicating linkage enable the linkage to function even if the pivotal axes of the suspension control arm pins 24 and 26 are not true longitudinal vehicle axes. The axes of such pins quite often deviate from longitudinal ones both vertically and horizontally by relatively small angles, approximately 15 degrees. These angular deviations do not affect the linkage greatly in performing its camber indicating function. This is due to the fact that these angular deviations of pins 24 and 26 from the longitudinal direction do not greatly affect the length of the linkage components in the plane in which the linkage moves angularly.

While preferred embodiments of the wheel camber angle indicating linkage have herein been described in detail, those skilled in the art will recognize various alternative embodiments and designs for practicing the present invention as defined by the following claims.

What is claimed is:

1. A wheel camber angle indicating linkage for a vehicle independent suspension system including a control arm pivoted to the sprung mass of the vehicle, and a wheel supporting member supported by the control arm, the linkage comprising: a first linkage portion adapted to extend between the wheel supporting member and the control arm so as to sense the angular relationship between the control arm and the wheel supporting member; a second linkage portion adapted to extend between the control arm and the sprung mass of the vehicle so as to sense the angular relationship between the control arm and the sprung mass of the vehicle; and means for comparing the angular relationships sensed by the first and second linkage portions so as to determine whether the wheel supporting member is angularly oriented so a wheel supported thereby has a camber angle that is proper.

2. A linkage as in claim 1 wherein each linkage portion includes a push-pull link and a lever pivoted to each other.

3. A linkage as in claim 2 which includes means for pivoting the levers of each linkage portion relative to each other and wherein at least one of said levers is adapted for being pivoted to the control arm at a predetermined location, means adapted to pivot the push-pull links to the wheel supporting member and the sprung mass of the vehicle at respective predetermined locations, said predetermined locations being selected such that the levers are pivotally positioned with respect to each other at a predetermined angle if the wheel supporting member is angularly oriented so a wheel supported thereby has a camber angle that is proper, and the levers being pivotally positioned with respect to each other at an angle other than the predetermined one if the wheel camber angle is not proper.

4. A linkage as in claim 3 wherein the lever of the second linkage portion constitutes the lever which is adapted for pivoting to the control arm.

5. A linkage as in claim 3 which includes ball and socket connections pivotally connecting the push-pull links of each linkage portion to their associated levers.

6. A linkage as in claim 3 wherein the means for comparing the angular relationships sensed by the first and second linkage portions includes visually observable indications on the levers of the linkage portions.

7. A linkage as in claim 3 wherein the means for comparing the angular relationships sensed by the first and second linkage portions includes an electric circuit for generating a signal when the angle between the levers deviates from the predetermined angle a predetermined extent.

8. A wheel camber angle indicating linkage for a vehicle independent suspension system including upper and lower control arms pivoted to the sprung mass of the vehicle, and a wheel supporting member supported by the control arms for vertical movement, the linkage comprising: a first linkage portion including a push-pull link and a lever pivoted to each other; means pivoting the push-pull link of the first linkage portion to the wheel supporting member at a predetermined location; a second linkage portion including a push-pull link and a lever pivoted to each other; means pivotally supporting the levers on the upper control arm at a predetermined location; means pivoting the push-pull link of the second linkage portion to the sprung mass of the vehicle at a predetermined location; the predetermined locations of pivoting being selected so the levers are pivotally positioned with respect to each other at a predetermined angle when the wheel supporting member is angularly oriented so a wheel supported thereby has a camber angle that is proper; the levers being pivotally positioned with respect to each other at an angle other than the predetermined one if the wheel camber angle is not proper; and means for comparing the angle of the levers with respect to each other so as to thereby determine whether the wheel camber angle is proper.

9. A wheel camber angle indicating linkage for a vehicle front independent suspension system including a control arm pivoted to the sprung mass of the vehicle, a ball joint mounted on the control arm, and a steering knuckle supported on the control arm by the ball joint for vertical movement relative to the vehicle and for angular movement about a steering axis of the knuckle, the linkage comprising: a first linkage portion adapted to extend between the control arm and the steering knuckle at a location generally along the steering axis thereof so as to sense the angular relationship between the steering knuckle and the control arm; a second linkage portion adapted to extend between the control arm and the sprung mass of the vehicle so as to sense the angular relationship between the control arm and the sprung mass of the vehicle; and means for comparing the angular relationships sensed by the first and second linkage portions so as to determine whether the steering knuckle is angularly oriented so a wheel carried thereby has a camber angle that is proper.

10. A linkage as in claim 9 wherein the first linkage portion includes a ball and a socket connection adapted to pivot this linkage portion to the steering knuckle so that the angular relationship sensed thereby can be accomplished regardless of the steering angle of the knuckle about its steering axis.

11. A linkage as in claim 10 wherein each linkage portion includes a push-pull link and a lever pivoted to each other, means for pivoting the levers of each linkage portion relative to each other and for pivoting at least one of said levers to the control arm at a predetermined location, means for pivoting the push-pull links to the steering knuckle and to the sprung mass of the vehicle at respective predetermined locations, the predetermined locations being selected so that the levers are pivotally positioned with respect to each other at a predetermined angle if the steering knuckle is angularly oriented so a wheel carried thereby has a camber angle that is proper, and the levers being pivotally positioned with respect to each other at an angle other than the predetermined one if the wheel camber angle is not proper.

12. A linkage as in claim 11 which includes ball and socket connections pivoting the push-pull links to their associated levers and pivoting the push-pull link of the second linkage portion to the sprung mass of the vehicle.

13. A linkage as in claim 11 wherein the means for comparing the angular relationships sensed by the linkage portions includes visually observable indications on the levers of the linkage portions.

14. A linkage as in claim 11 wherein the means for comparing the angular relationships sensed by the linkage portions includes an electric circuit for generating a signal when the angle between the levers deviates from the predetermined angle a predetermined extent.

15. A wheel camber angle indicating linkage for a vehicle front independent suspension system including upper and lower control arms pivoted to the vehicle, a pair of ball joints respectively supported by the control arms, and a steering knuckle supported on the control arms by the ball joints for vertical movement and for angular movement about a steering axis of the knuckle, the linkage comprising: a first linkage portion including a push-pull link and a lever pivoted to each other; a ball and socket connection pivotally connecting the push-pull link of the first linkage portion to the steering knuckle generally along the steering axis thereof at a predetermined location; a second linkage portion including a push-pull link and a lever pivoted to each other; said levers of the linkage portions being pivoted relative to each other and at least one of the levers being pivoted to the upper control arm at a predetermined location; the push-pull link of the second linkage portion being pivoted to the sprung mass of the vehicle at a predetermined location; said predetermined locations being selected so the levers are pivotally positioned with respect to each other at a predetermined angle when the steering knuckle is oriented so a wheel carried thereby has a camber angle that is proper; and means for comparing the angle between the levers to thereby determine whether the wheel camber angle is proper.

* * * * *